2 Sheets—Sheet 1.

I. M. ROSE.

Assignor, by mesne Assignments, to I. W. BARNUM.

Tuck-Creasing Attachment for Sewing-Machine.

No. 8,236. Reissued May 21, 1878.

*Witnesses.*

Earle H. Smith

M. J. Barnum

Isaac W. Barnum,
assee of J. M. Rose,
Inventor,
By Daniel Barnum
attorney

N. PETERS, PHOTO-LITHOGRAPHER, WASHINGTON, D. C.

I. M. ROSE.

Assignor, by mesne Assignments, to I. W. BARNUM.

Tuck-Creasing Attachment for Sewing-Machine.

No. 8,236. Reissued May 21, 1878.

*Witnesses.*

Earle H. Smith

M. J. Barnum

Isaac W. Barnum,
assee. of I. M. Rose.
Inventor
By Daniel Barnum
attorney

N. PETERS, PHOTO-LITHOGRAPHER, WASHINGTON, D. C.

UNITED STATES PATENT OFFICE.

ISAAC W. BARNUM, OF BROOKLYN, NEW YORK, ASSIGNEE, BY MESNE ASSIGNMENTS, OF ISRAEL M. ROSE.

IMPROVEMENT IN TUCK-CREASING ATTACHMENTS FOR SEWING-MACHINES.

Specification forming part of Letters Patent No. 40,084, dated September 22, 1863; Reissue No. 3,218, dated December 1, 1868; Reissue No. 8,236, dated May 21, 1878; application filed April 1, 1878.

*To all whom it may concern:*

Be it known that ISRAEL M. ROSE, of New York, in the county of New York and State of New York, did invent certain new and useful Improvements in Mechanism Used as an Attachment to Sewing-Machines for Marking Tucks; and I hereby declare that the following is a full, clear, and exact description of the same, reference being had to the accompanying drawings, in which—

Figure 1:
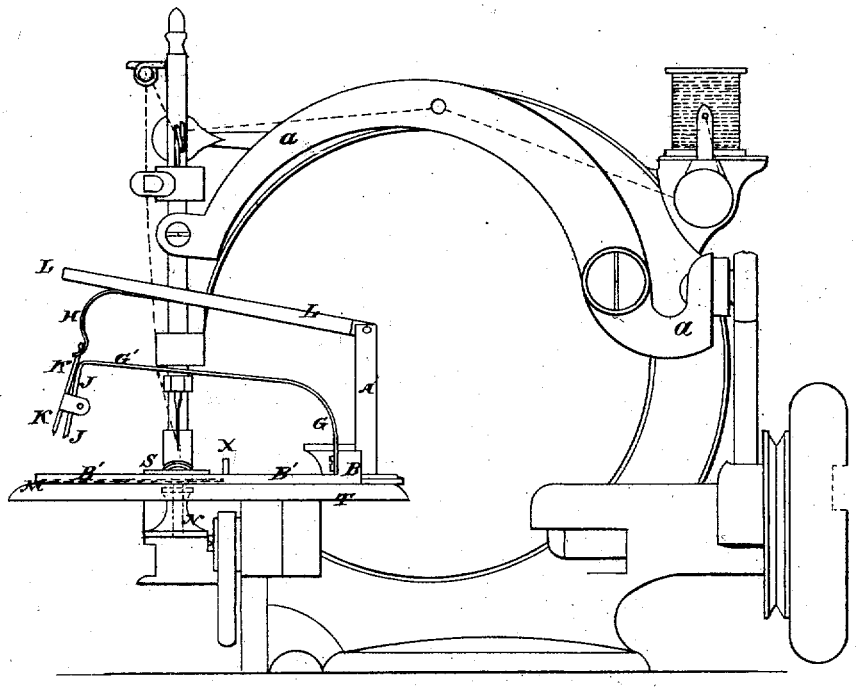
Figure 2:
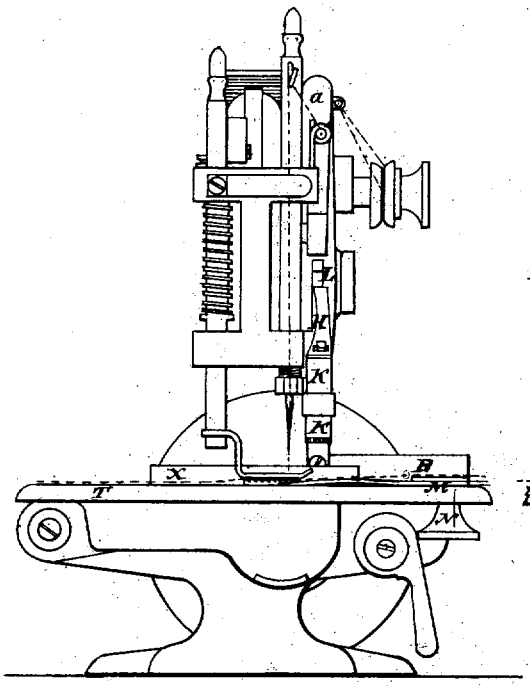
Figure 4:
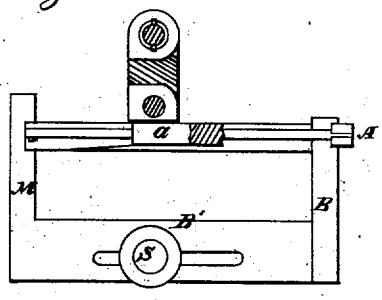
Figure 3:
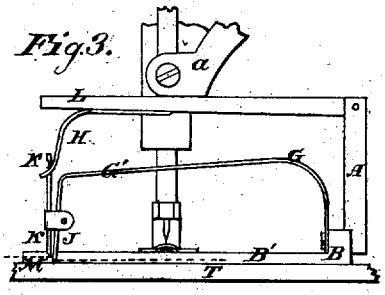

Figure 1 represents a side elevation of a sewing-machine having attached to it the improvement or apparatus as the subject-matter of this patent. Fig. 2 is a front view of the same. Fig. 3 is a side view of the apparatus for marking tucks, with the fragment of a sewing-machine, showing the needle bar or arm and the action of either on the said apparatus when the machine is operated. Fig. 4 is a plan view of the parts represented in Fig. 3.

Tucks were heretofore determined on sewing-machines by some piercing or marking instrument, vibrated or held to bear with constant pressure upon the cloth in a line adjustable at the pleasure of the operator.

The objections to the former were that the cloth was either injured by the large holes made by the piercing-needle, or the holes were so small as to leave almost imperceptible marks, and that in either instance it was necessary carefully to crimp and fold the cloth by following the trace of the holes. Fine fabrics were particularly liable to injury by this mode of marking tucks, and it had to be abandoned.

The objections to the marking of tucks by means of an instrument constantly pressing on the material are still more serious. It will be understood that the pressure to produce a pencil-mark on, or a permament depression or crease in, the cloth is by no means inconsiderable. Now, if the material to be operated upon be limber, the tendency is to drag it by the feed, and cause a tuck-mark to be produced which will not be in a line parallel with the seam.

To obviate these and other defects in tucking-gages heretofore in use is the object of the invention; and it consists in a mechanism, actuated by the sewing-machine, intermittent in its operation, and pinching the cloth at regular intervals and in unison with the action of the machine, so as to leave a perfect ridge, in conformity with which the cloth will naturally fold to form a tuck.

To enable others skilled in the art to make and use it, this improvement will now be described.

The apparatus consists of a pair of jaws, having their ends sharp and serrated. One of the jaws is permanently fixed to the end of an arm or spring, which is fastened by any suitable device to the machine, and when at rest remains clear of the cloth, but is capable of being sprung down to touch it. The other jaw is hinged to the first, and both jaws are made to descend and close tightly, and in doing so take hold of the cloth and pinch a ridge in it parallel to the action of the feed of the machine, by being operated during every descent of the needle-arms or other working part of the machine.

Attached to the apparatus, and forming part of the same, is a piece of metal, which projects parallel to and in front of the permanently-fixed jaw, and lies close to the cloth-plate of the machine. Upon it the movable jaw presses the cloth, enabling it to gather the cloth up preparatory to pinching it between itself and the stationary jaw.

The whole apparatus is capable of being moved at right angles to the action of the feed to adjust it to different widths of tucks.

In the accompanying drawings, A is an upright standard, firmly secured to a base-plate, B, at right angles with which is an extension, B′, whereby the whole apparatus may be attached to the sewing-table T by means of a set-screw, S, whose shank passes down through slots in the base-plate extension B′ and sewing-table, and is drawn taut by the nut N. To the upper end of the standard, and in the plane of motion of the needle-arm *a* of the sewing-machine, is a jointed lever, L, which, receiving motion from the needle-arm, imparts it to and actuates the other moving parts of the tucking-machine.

It will be understood that it is not absolutely necessary for the operation of the apparatus that the lever should be located in the plane of motion of the needle-arm. It may be placed at some distance therefrom, provided there be a piece projecting either from the needle-arm to come, during its descent, in contact with the lever, or, vice versa, from the lever, to be struck or moved by the needle-arm while being operated. This lever is held away from the cloth when the needle of the sewing-machine is withdrawn therefrom by two springs, G and H, one of which (the former) is fast to the base-plate B, while the other is secured to the lever.

The spring G G′ is an elastic blade, whose flexibility at or near its attachment to the base-plate produces a tendency to elevate the branch G′, the end of which is bent at an angle of one hundred degrees, more or less, in relation to the branch, and is provided with a serrated surface and griping-edge, constituting one of the jaws hereinbefore referred to. To this jaw, at or near the middle portion thereof, is hinged another jaw, K, similarly serrated and sharp-edged, whose upper end, however, is buckled with the spring H in such manner as to cause the jaws to open unless compressed, in which case the two jaws are caused to close, and gripe any intervening material.

Immediately underneath the two jaws, and directly in front of the rear jaw J, when depressed so as to be in contact with the sewing-table, there is a strip of metal, M, soldered or otherwise attached to the base-plate B′, and the two jaws are so arranged that, when depressed by the needle-arm actuating the lever L, the two jaws are brought down open until the jaw J, on the one hand, impinges on the table against the interior edge of the metal strip M, while the jaw K, on the other hand, impinges on the cloth lying on the strip. Then, by the resistance offered by the table and by the farther descent of the needle-arm, the spring H is compressed, forcing the upper end of the jaw K to move away from the upper end of the jaw J, and thereby causing the lower end to approach and firmly grasp the cloth that may be between them.

In Figs. 1 and 3 the extreme positions of the parts are indicated, and their action on the cloth illustrated.

To enable any one to use the device herein described, the following directions for its use are now given: A fold having first been made in the cloth by hand, the gage is fixed, by means of set-screw S, to make a seam the proper distance from the edge for the required tuck. The tucker is then adjusted so that the distance between the needle and the interior edge of the metal strip M and the jaws that form the ridge on the cloth is at least double the distance between the needle and the gage; and then, keeping the folded edge of the cloth against the gage, it is fed through the machine, when a clear and well-defined ridge will be made in the cloth by the action of the tucker at the same time that a seam has been sewed in the folded cloth, forming a tuck. The cloth is next removed from the machine and folded upon the ridge. The work is thus proceeded with, and each time a tuck is sewed the ridge for the succeeding one is made.

And now, having at the first stated that the said ISRAEL M. ROSE has invented certain new and useful improvements in mechanisms used as an attachment to sewing-machines for marking tucks, and having described several objections, and declared that to obviate these and other defects in tucking-gages heretofore in use is the object of this invention, I do not claim under and upper tuck markers or creasers separately attached to sewing-machines and separately adjustable to different widths of tucks, as was the case with all tuck creasing or marking mechanisms known prior to this invention; nor do I claim spring-arms as new for vibrating an upper marker, except when used on an adjustable base-plate to adjust and secure a fixed relation of the upper marker to the under marker when vibrated by some moving part of the sewing-machine to form a crease, as well as to secure an adjustable relation of both under and upper markers relatively with the needle for different widths of tucks as a unit.

What is claimed, and desired to be secured by Letters Patent of the United States, is as follows:

1. A tuck-creasing mechanism having its upper and under parts connected together as a unit, in combination with a sewing-machine, whereby the said mechanism may be adjusted with relation to the needle while at rest for different widths of tucks, substantially as described.

2. A tuck creasing or pinching mechanism, consisting of jaws or of opposing surfaces arranged on an adjustable base-plate, which carries a piece of metal at M for raising the cloth, in combination with a sewing-machine, substantially as described, whereby the said jaws or surfaces are opened and closed at regular intervals by the needle-arm, and made to impinge on the cloth raised by the said piece of metal at M, and to seize the cloth thus raised and gather it up preparatory to pinching it on itself between the jaws or pinching-surfaces as they are brought together by the farther descent of the needle-arm, substantially as specified.

3. In a tuck-creasing attachment, the combination, with a sewing-machine, of an adjustable base-plate formed with extensions at each end, to which are connected upper and under parts of a tuck-creasing mechanism, leaving the space between the extensions and around the presser-foot open, substantially as specified, whereby the creasing devices may be located in the plane of motion of the needle-arm, and adjusted to the needle together for different widths of tucks, while the cloth will pass freely to the needle and creasing devices by the action of the feed in parallel lines, either straight or curved, substantially as specified.

I. W. BARNUM.

Witnesses:
DANIEL BARNUM,
E. B. BARNUM.